US 11,985,980 B2

(12) United States Patent
Puckerin et al.

(10) Patent No.: US 11,985,980 B2
(45) Date of Patent: May 21, 2024

(54) AUTOMATED PIZZA OVEN ASSEMBLY

(71) Applicants: Derwin Puckerin, Hinesville, GA (US); Annette Puckerin, Hinesville, GA (US)

(72) Inventors: Derwin Puckerin, Hinesville, GA (US); Annette Puckerin, Hinesville, GA (US)

( * ) Notice: Subject to any disclaimer, the term of this patent is extended or adjusted under 35 U.S.C. 154(b) by 717 days.

(21) Appl. No.: 16/866,744

(22) Filed: May 5, 2020

(65) Prior Publication Data

US 2021/0345622 A1    Nov. 11, 2021

(51) Int. Cl.
| | | |
|---|---|---|
| *A21B 1/48* | (2006.01) | |
| *A21C 15/04* | (2006.01) | |
| *A21D 13/41* | (2017.01) | |
| *B65G 39/00* | (2006.01) | |
| *F24C 7/08* | (2006.01) | |
| *H05B 3/00* | (2006.01) | |

(52) U.S. Cl.
CPC ............... *A21B 1/48* (2013.01); *A21C 15/04* (2013.01); *A21D 13/41* (2017.01); *B65G 39/00* (2013.01); *F24C 7/085* (2013.01); *H05B 3/0076* (2013.01)

(58) Field of Classification Search
CPC .......... A21B 1/48; A21C 15/04; A21D 13/41; B65G 39/00; A47J 37/045; F24C 7/085; H05B 3/0076
See application file for complete search history.

(56) References Cited

U.S. PATENT DOCUMENTS

| | | |
|---|---|---|
| 2,906,020 A | 9/1959 | Welsh |
| 4,276,465 A | 6/1981 | Flavio |
| D298,790 S | 12/1988 | Hutchinson |
| 5,112,630 A | 5/1992 | Scott |
| 5,686,004 A | 11/1997 | Schneider |
| 5,873,294 A * | 2/1999 | Sciuto .................... B26D 3/245 83/633 |

(Continued)

FOREIGN PATENT DOCUMENTS

WO    WO2007124583    11/2007

OTHER PUBLICATIONS

The Pauper Chef, Pizza Hack: Broil Your Pies, Jun. 13, 2019, Serious Eats, <https://www.seriouseats.com/broiled-pizza#:~:text=The%20only%20equipment%20you'll,1%20minute%20and%2035%20seconds.> (Year: 2019).*

(Continued)

*Primary Examiner* — Dana Ross
*Assistant Examiner* — James F Sims, III

(57) ABSTRACT

An automated pizza oven assembly includes an oven that has an entry and an exit. A conveyor extends through the entry and the exit, and a pizza is positionable on the conveyor. The conveyor transports the pizza through the oven to cook the pizza. A cutting unit is coupled to and extends away from the oven such that the cutting unit is positioned above the conveyor. The cutting unit includes a plurality of blades and each of the blades radiating outwardly from a central point of the cutting unit. The blades are urged downwardly onto the pizza when the cutting unit is turned on to cut the pizza into a plurality of slices. A control unit is coupled to the oven and the control unit is in communication with the heating element in the oven, the conveyor and the cutting unit. The control unit controls operational parameters of the heating element, the conveyor and the cutting unit.

14 Claims, 4 Drawing Sheets

(56) References Cited

U.S. PATENT DOCUMENTS

| | | | |
|---|---|---|---|
| 5,997,924 A | 12/1999 | Olander, Jr. | |
| 6,557,260 B1 | 5/2003 | Morris | |
| 6,707,014 B1 * | 3/2004 | Corey | B65G 17/067 |
| | | | 219/494 |
| 7,984,667 B2 | 7/2011 | Freudinger | |
| 8,555,763 B2 | 10/2013 | Farid | |
| 2004/0153283 A1 * | 8/2004 | Wargon | G01B 21/00 |
| | | | 702/156 |
| 2018/0338504 A1 * | 11/2018 | Lavri | A21C 3/02 |

OTHER PUBLICATIONS

Ashlee Clark Thomson, Think twice before you toss your oven manual (pictures), Sep. 15, 2015, CNET, <https://www.cnet.com/pictures/7-reasons-oven-manual-pictures/> (Year: 2015).*

Certified Appliance Accessories 50-Amp Appliance Power Cord, 3 Prong Range Cord, 3 Wires with Eyelet Connectors, 10 Feet, Copper Wire, Jul. 7, 2004, Amazon.com, <https://www.amazon.com/Certified-Appliance-Accessories-3-Wire-Closed-Eyelet/dp/B001DICWSG> (Year: 2004).*

* cited by examiner

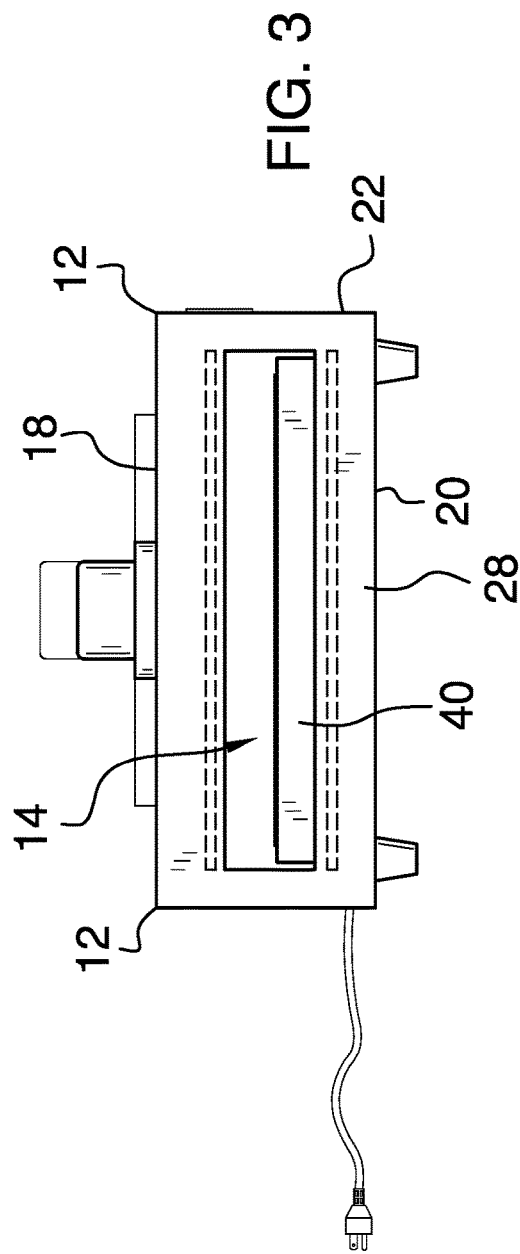
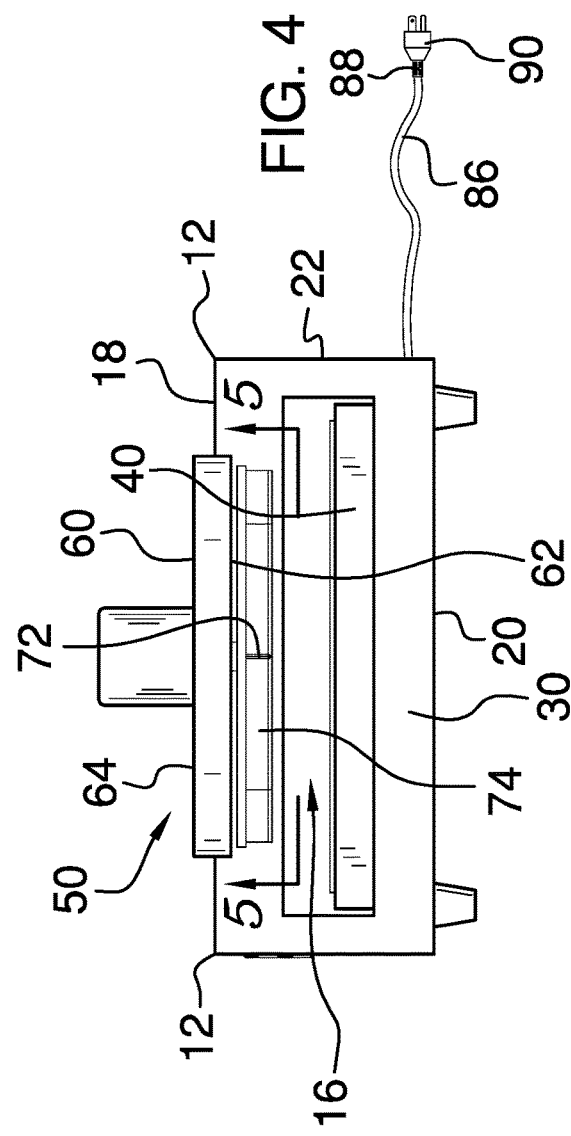

AUTOMATED PIZZA OVEN ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pizza oven devices and more particularly pertains to a new pizza oven device for cooking and slicing a pizza.

(2) Description of Related Art Including Information Disclosed Under 37 CFR 1.97 and 1.98

The prior art relates to pizza oven devices. The prior art discloses a variety of pizza cutters that each includes a plurality of blades radiating outwardly from a central point for cutting a pizza into a plurality of slices. The prior art discloses a variety of electric pizza ovens that each includes a conveyor for transporting a pizza through the electric pizza ovens for cooking the pizza. The prior art discloses an automated vending machine the cooks and dispenses slices of pizza. In no case in the prior art is the combination of a conveyor belt, a pizza oven and a pizza cutter disclosed.

BRIEF SUMMARY OF THE INVENTION

An embodiment of the disclosure meets the needs presented above by generally comprising an oven that has an entry and an exit. A conveyor extends through the entry and the exit, and a pizza is positionable on the conveyor. The conveyor transports the pizza through the oven to cook the pizza. A cutting unit is coupled to and extends away from the oven such that the cutting unit is positioned above the conveyor. The cutting unit includes a plurality of blades and each of the blades radiating outwardly from a central point of the cutting unit. The blades are urged downwardly onto the pizza when the cutting unit is turned on to cut the pizza into a plurality of slices. A control unit is coupled to the oven and the control unit is in communication with the heating element in the oven, the conveyor and the cutting unit. The control unit controls operational parameters of the heating element, the conveyor and the cutting unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a back view of an embodiment of the disclosure.

FIG. 4 is a front view of an embodiment of the disclosure.

DETAILED DESCRIPTION OF THE INVENTION

Figure 1:
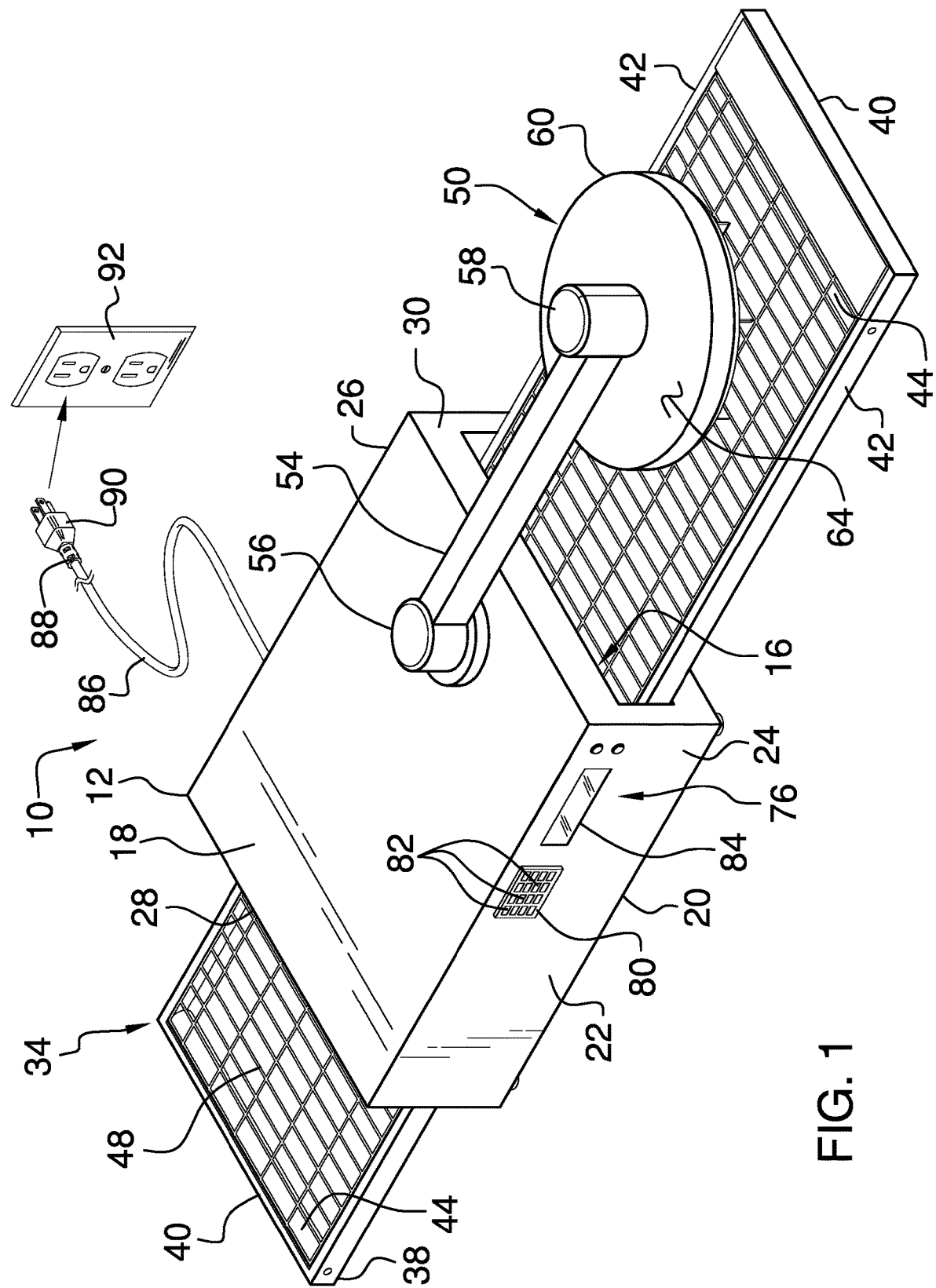
FIG. 1 is a top perspective view of an automated pizza oven assembly according to an embodiment of the disclosure.
Figure 2:
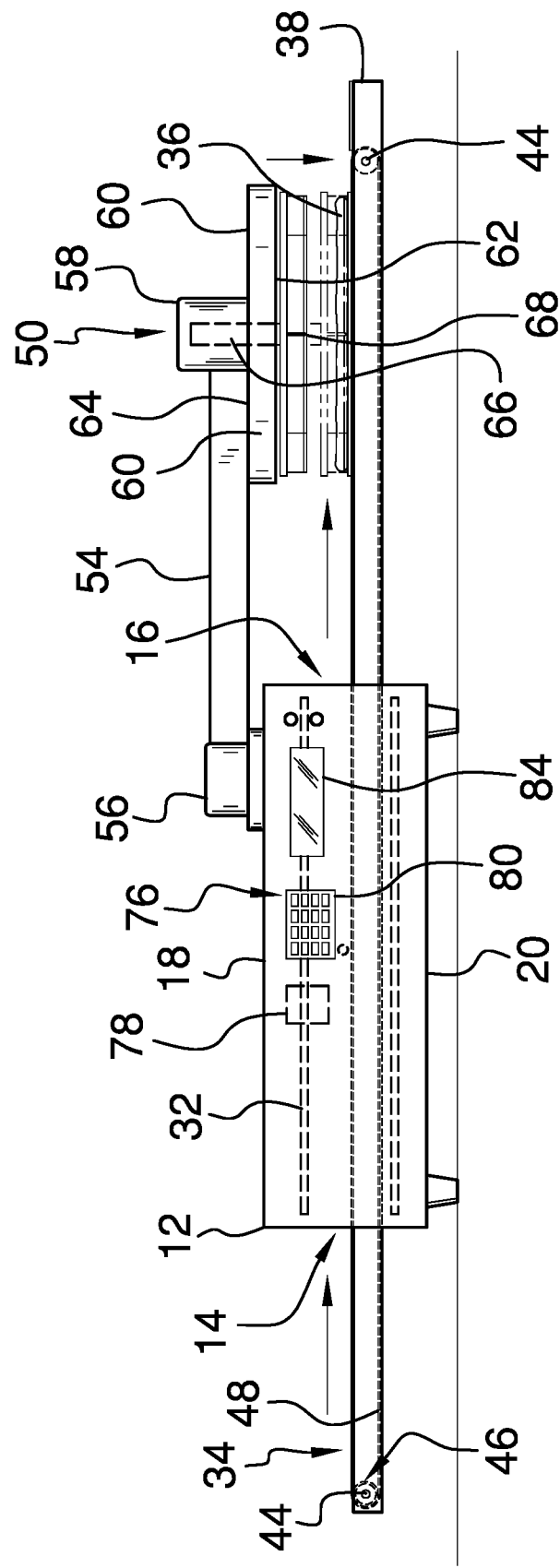
FIG. 2 is a right side phantom view of an embodiment of the disclosure.
Figure 5:
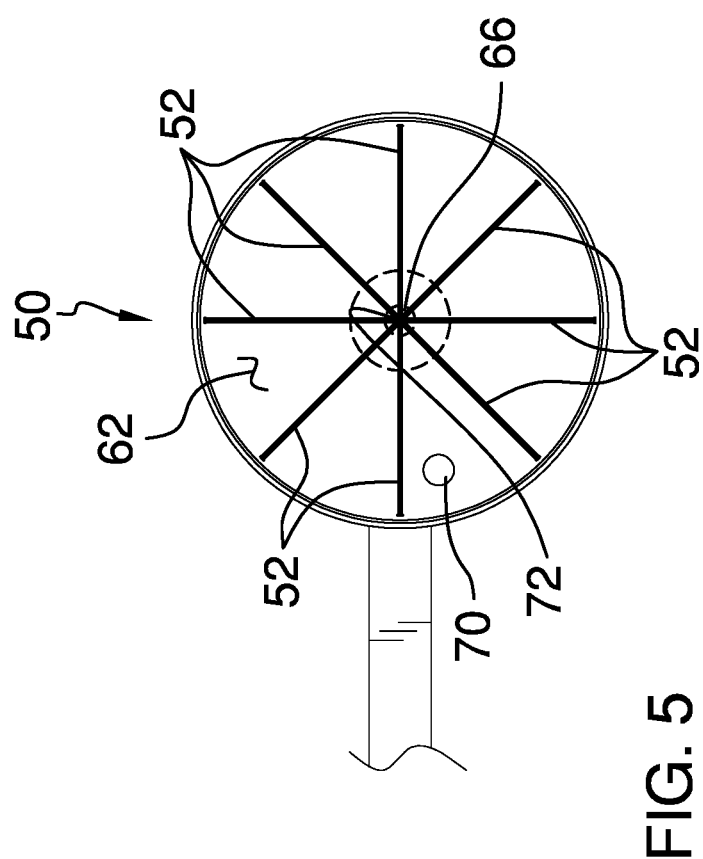
FIG. 5 is a cross sectional view taken along line 5-5 of FIG. 4 of an embodiment of the disclosure.

With reference now to the drawings, and in particular to FIGS. 1 through 5 thereof, a new pizza oven device embodying the principles and concepts of an embodiment of the disclosure and generally designated by the reference numeral 10 will be described.

As best illustrated in FIGS. 1 through 5, the automated pizza oven assembly 10 generally comprises an oven 12 that has an entry 14 and an exit 16. The oven 12 has a top wall 18, a bottom wall 20 and an outer wall 22 extending therebetween, and the outer wall 22 has a front side 24, a back side 26, a first lateral side 28 and a second lateral side 30. The oven 12 is hollow, the entry 14 extends through the back side 26 and the exit 16 extends through the front side 24. A heating element 32 is positioned within the oven 12 and the heating element 32 is positioned adjacent to the top wall 18. The heating element 32 may be an electric heating element with an operational temperature ranging between approximately 350.0 degrees Fahrenheit and 450.0 degrees Fahrenheit.

A conveyor 34 is provided that extends through the entry 14 and the exit 16, and a pizza 36 can be positioned on the conveyor 34. The conveyor 34 transports the pizza 36 through the oven 12 to cook the pizza 36. The conveyor 34 comprises a frame 38 that has a pair of end members 40 each extending between a pair of side members 42. The side members 42 are spaced apart from each other such that the frame 38 has a rectangular shape. The frame 38 extends through each of the entry 14 and the exit 16 of the oven 12. The conveyor 34 includes plurality of rollers 44 that are spaced apart from each other and are distributed between each of the end members 40 of the frame 38. Each of the rollers 44 extends between the pair of side members 42, and each of the rollers 44 is rotatably coupled to each of the side members 42.

The conveyor 34 includes a motor 46 that is coupled to a respective one of the rollers 44. The respective roller is rotated in a first direction when the motor 46 is turned on. The motor 46 may be an electric motor or the like. The conveyor 34 includes a belt 48 that is wrapped around the plurality of rollers 44 such that the belt 48 extends through the entry 14 and the exit 16 in the oven 12. The pizza 36 is positionable on the belt 48 and the belt 48 travels into the entry 14 and out of the exit 16 when the motor 46 is turned on. In this way the pizza 36 is cooked in the oven 12.

A cutting unit 50 is included and the cutting unit 50 is coupled to and extends away from the oven 12 such that the cutting unit 50 is positioned above the conveyor 34. The cutting unit 50 includes a plurality of blades 52 that each radiates outwardly from a central point of the cutting unit 50. The blades 52 are urged downwardly onto the pizza 36 when the cutting unit 50 is turned on to cut the pizza 36 into a plurality of slices. The cutting unit 50 comprises an arm 54 that has a first end 56 and a second end 58. The first end 56 is coupled to the top wall 18 of the oven 12 having the arm 54 extending beyond the exit 16 of the oven 12 and the second end 58 is spaced upwardly from the belt 48 of the conveyor 34.

The cutting unit 50 includes a disk 60 that has a bottom surface 62 and a top surface 64, and the top surface 64 is coupled to the second end 58 of the arm 54 having the bottom surface 62 being directed toward the belt 48. The cutting unit 50 includes an actuator 66 that is coupled to the bottom surface 62 and the actuator 66 extends downwardly toward the belt 48 when the actuator 66 is turned on. Conversely, the actuator 66 is retracted toward the disk 60 when the actuator 66 is turned off. The actuator 66 has a distal end 68 with respect to the bottom surface 62 of the disk 60. The cutting unit 50 includes a sensor 70 that is attached to the arm 54 and the sensor 70 is electrically coupled to the control circuit 78. The sensor 70 detects when the pizza 36 is positioned beneath the blades 52 and the actuator 66 is turned on when the sensor 70 detects the pizza 36. The sensor 70 may be an optical sensor, a mechanical position switch, a light sensor or any other type of electronic sensor that can sense the location of the pizza 36 with respect to the cutting unit 50.

Each of the blades 52 has a primary end 72 and a bottom edge 74, and the bottom edge 74 of each of the blades 52 is sharpened. The primary end 72 of each of the blades 52 is coupled to the distal end 68 of the actuator 66 and each of the blades 52 is oriented to extend along a line is oriented perpendicular to a vertical axis of the actuator 66. The blades 52 radiate around the actuator 66 having the bottom edge 74 being directed toward the belt. Additionally, the bottom edge 74 cuts through the pizza 36 when the actuator 66 is turned on.

A control unit 76 is included and the control unit 76 is coupled to the oven 12. The control unit 76 is in communication with the heating element 32 in the oven 12, the conveyor 34 and the cutting unit 50. The control unit 76 controls operational parameters of the heating element 32, the conveyor 34 and the cutting unit 50. The control unit 76 comprises a control circuit 78 that is coupled to the oven 12 the control circuit 78 is electrically coupled to each of the heating element 32, the motor associated with the conveyor 34 and the actuator 66 associated with the cutting unit 50.

The control unit 76 includes a keypad 80 that is coupled to the oven 12 and the keypad 80 is electrically coupled to the control circuit 78. The keypad 80 includes a plurality of buttons 82 that are each depressible for programming operational parameters into the control circuit 78. The operational parameters include, but are not limited to, power on and power off, cooking time of the pizza 36, cooking temperature for the pizza 36 and rotation speed of the conveyor 34. The control unit 76 includes a display 84 that is coupled to the oven 12. The display 84 is electrically coupled to the control circuit 78 and the display 84 displays indicia comprising words to communicate selected operational parameters of the control circuit 78. A power cord 86 is coupled to the oven 12 and the power cord 86 is electrically coupled to the control circuit 78. The power cord 86 has a distal end 88 with respect to the oven 12 and a male plug 90 is electrically coupled thereto for inserting in a power source 92 comprising a female electrical outlet.

In use, the pizza 36 is positioned on the belt 48 and the belt 48 transports the pizza 36 through the oven 12 for cooking the pizza 36. The actuator 66 is turned on the lower the blades 52 through the pizza 36 when the sensor 70 senses that the pizza 36 is beneath the blades 52. In this way the pizza 36 is automatically cooked and sliced. The buttons on the keypad are manipulated to adjust the cooking time of the pizza, the intensity of the heat output from the heating element and other operational parameters.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An automated pizza oven assembly for automatically cooking and cutting a pizza, said assembly comprising:
   an oven having an entry and an exit;
   a conveyor extending through said entry and said exit, said conveyor having a pizza being positionable thereon, said conveyor transporting the pizza through said oven wherein said oven is configured to cook the pizza;
   a cutting unit being coupled to and extending away from said oven such that said cutting unit is positioned above said conveyor, said cutting unit including a plurality of blades, each of said blades radiating outwardly from a central point of said cutting unit, said cutting unit including a sensor for detecting when the pizza is positioned beneath the blades, said blades being urged downwardly onto the pizza when said cutting unit is turned on, wherein said cutting unit is configured to cut the pizza into a plurality of slices; and a control unit being coupled to said oven, said control unit being in communication with said conveyor and said cutting unit, said control unit controlling operational parameters of said conveyor and said cutting unit.

2. The assembly according to claim 1, wherein said oven has a top wall, a bottom wall and an outer wall extending therebetween, said outer wall having a front side, a back side, a first lateral side and a second lateral side, said oven being hollow, said entry extending through said back side, said exit extending through said front side, said oven having a heating element being positioned within said oven, said heating element being positioned adjacent to said top wall.

3. The assembly according to claim 1, wherein said conveyor comprises a plurality of rollers, said plurality of rollers being spaced apart from each other and being distributed along a line extending through said entry and said exit in said oven.

4. The assembly according to claim 3, wherein said conveyor comprises a motor being coupled to a respective one of said rollers, said respective roller being rotated in a first direction when said motor is turned on.

5. The assembly according to claim 4, wherein said conveyor comprises a belt being wrapped around said plurality of rollers such that said belt extends through said entry and said exit in said oven, said belt having the pizza being positioned thereon, said belt travelling into said entry and out of said exit when said motor is turned on thereby facilitating the pizza to be cooked.

6. The assembly according to claim 2, wherein said cutting unit comprises an arm having a first end and a second end, said first end being coupled to said top wall of said oven having said arm extending beyond said exit of said oven, said second end being spaced upwardly from a belt of said conveyor.

7. The assembly according to claim 6, Wherein said cutting unit comprises a disk having a bottom surface and a top surface, said top surface being coupled to said second end of said arm having said bottom surface being directed toward said belt, said sensor being coupled to said bottom surface.

8. The assembly according to claim 7, wherein said cutting unit includes an actuator being coupled to said bottom surface, said actuator extending downwardly toward said belt when said actuator is turned on, said actuator being retracted toward said disk when said actuator is turned off, said actuator having a distal end with respect to said bottom surface of said disk.

9. The assembly according to claim 8, wherein each of said blades has a primary end and a bottom edge, said bottom edge of each of said blades being sharpened, said primary end of each of said blades being coupled to said distal end of said actuator, each of said blades being oriented to extend along a line being oriented perpendicular to a vertical axis of said actuator, said blades radiating around said actuator having said bottom edge being directed toward said belt of said conveyor, said bottom edge cutting through the pizza when said actuator is turned on.

10. The assembly according to claim 1, wherein:
said oven includes a heating element;
said conveyor includes a motor;
said cutting unit includes an actuator; and
said control unit comprises a control circuit being coupled to said oven, said control circuit being electrically coupled to each of said heating element, said motor and said actuator.

11. The assembly according to claim 10, wherein said control unit includes a keypad being coupled to said oven, said keypad being electrically coupled to said control circuit, said keypad including a plurality of buttons that are each depressible for programming operational parameters into said control circuit, said operational parameters including power on and power off, cooking time of the pizza, cooking temperature for the pizza and rotation speed of the conveyor.

12. The assembly according to claim 10, wherein said control unit includes a display being coupled to said oven, said display being electrically coupled to said control circuit, said display displaying indicia comprising words to communicate selected operational parameters of said control circuit.

13. The assembly according to claim 10, further comprising a power cord being coupled to said oven, said power cord being electrically coupled to said control circuit, said power cord having a distal end with respect to said oven, said distal end having a male plug being electrically coupled thereto for inserting in a power source comprising a female electrical outlet.

14. An automated pizza oven assembly for automatically cooking and cutting a pizza, said assembly comprising:
an oven having an entry and an exit, said oven having a top wall, a bottom wall and an outer wall extending therebetween, said outer wall having a front side, a back side, a first lateral side and a second lateral side, said oven being hollow, said entry extending through said back side, said exit extending through said front side, said oven having a heating element being positioned within said oven, said heating element being positioned adjacent to said top wall;
a conveyor extending through said entry and said exit, said conveyor having a pizza being positionable thereon, said conveyor transporting the pizza through said oven wherein said oven is configured to cook the pizza, said conveyor comprising:
a plurality of rollers, said plurality of rollers being spaced apart from each other and being distributed along a line extending through said entry and said exit in said oven;
a motor being coupled to a respective one of said rollers, said respective roller being rotated in a first direction when said motor is turned on; and
a belt being wrapped around said plurality of rollers such that said belt extends through said entry and said exit in said oven, said belt having the pizza being positioned thereon, said belt travelling into said entry and out of said exit when said motor is turned on thereby facilitating the pizza to be cooked;
a cutting unit being coupled to and extending away from said oven such that said cutting unit is positioned above said conveyor, said cutting unit including a plurality of blades, each of said blades radiating outwardly from a central point of said cutting unit, said cutting unit including a sensor for detecting when the pizza is positioned beneath the blades, said blades being urged downwardly onto the pizza when said cutting unit is turned on, wherein said cutting unit is configured to cut e pizza into a plurality of slices, said cutting unit comprising:
an arm having a first end and a second end, said first end being coupled to said top wall of said oven having said arm extending beyond said exit of said oven, said second end being spaced upwardly from said belt of said conveyor;

a disk having a bottom surface and a top surface, said top surface being coupled to said second end of said arm having said bottom surface being directed toward said belt, said sensor being coupled to said bottom surface;

an actuator being coupled to said bottom surface, said actuator extending downwardly toward said belt when said actuator is turned on, said actuator being retracted toward said disk when said actuator is turned off, said actuator having a distal end with respect to said bottom surface of said disk;

wherein each of said blades has a primary end and a bottom edge, said bottom edge of each of said blades being sharpened, said primary end of each of said blades being coupled to said distal end of said actuator, each of said blades being oriented to extend along a line being oriented perpendicular to a vertical axis of said actuator, said blades radiating around said actuator having said bottom edge being directed toward said belt, said bottom edge cutting through the pizza when said actuator is turned on; and a control unit being coupled to said oven, said control unit being in communication with said heating element in said oven, said conveyor and said cutting unit, said control unit controlling operational parameters of said heating element, said conveyor and said cutting unit, said control unit comprising:

a control circuit being coupled to said oven said control circuit being electrically coupled to each of said heating element, said motor associated with said conveyor and said actuator associated with said cutting unit;

a keypad being coupled to said oven, said keypad being electrically coupled to said control circuit, said keypad including a plurality of buttons that are each depressible for programming operational parameters into said control circuit, said operational parameters including power on and power off, cooking time of the pizza, cooking temperature for the pizza and rotation speed of the conveyor; and a display being coupled to said oven, said display being electrically coupled to said control circuit, said display displaying indicia comprising words to communicate selected operational parameters of said control circuit; and a power cord being coupled to said oven, said power cord being electrically coupled to said control circuit, said power cord having a distal end with respect to said oven, said distal end having a male plug being electrically coupled thereto for inserting in a power source comprising a female electrical outlet.

\* \* \* \* \*